United States Patent
Yamada et al.

(10) Patent No.: US 12,396,388 B2
(45) Date of Patent: Aug. 26, 2025

(54) ELECTRIC WORK VEHICLE

(71) Applicant: Kubota Corporation, Osaka (JP)

(72) Inventors: Masahiro Yamada, Sakai (JP); Hirokazu Ito, Sakai (JP); Makoto Odagiri, Sakai (JP)

(73) Assignee: Kubota Corporation, Osaka (JP)

( * ) Notice: Subject to any disclaimer, the term of this patent is extended or adjusted under 35 U.S.C. 154(b) by 926 days.

(21) Appl. No.: 17/548,860

(22) Filed: Dec. 13, 2021

(65) Prior Publication Data
US 2022/0248600 A1 Aug. 11, 2022

(30) Foreign Application Priority Data
Feb. 5, 2021 (JP) .................... 2021-017581

(51) Int. Cl.
*A01D 34/78* (2006.01)
*A01D 34/82* (2006.01)
(Continued)

(52) U.S. Cl.
CPC ............. *A01D 34/78* (2013.01); *A01D 34/82* (2013.01); *A01D 69/02* (2013.01); *B60L 53/80* (2019.02)

(58) Field of Classification Search
CPC ........ A01D 34/78; A01D 34/82; A01D 69/02; B60L 53/80; B60L 50/66; B60L 2200/40; H01M 50/249; H01M 50/256; H01M 2220/20; B60K 2001/0416; B60K 2001/0455; B60K 2001/0477; B60K 2001/0494; B60K 1/04; B60Y 2200/223; B60Y 2200/41
(Continued)

(56) References Cited

U.S. PATENT DOCUMENTS

| 4,042,054 A | * | 8/1977 | Ward | ............... B60L 53/80 |
| | | | | 180/68.5 |
| 8,960,351 B1 | * | 2/2015 | Maeda | ............... B60R 16/04 |
| | | | | 180/68.5 |

(Continued)

FOREIGN PATENT DOCUMENTS

| DE | 4320993 A1 | 1/1995 |
| EP | 3739658 A1 | 11/2020 |

(Continued)

OTHER PUBLICATIONS

Rollover Protection and Operating Tractors Safely, by OSHA. Retrieved from URL http://osha.gov/sites/default/files/publications/OSHA3965.pdf on Jun. 3, 2025 (Year: 2019).*

*Primary Examiner* — Valentin Neacsu
(74) *Attorney, Agent, or Firm* — The Webb Law Firm (57) ABSTRACT

An electric work vehicle includes an electric work machine including a battery mounting unit on which a battery is detachably mountable; a battery housing unit supported by at least one wheel and configured to house the battery; and a battery carrier including the at least one wheel and a manual push handle configured to be manually pushed to move the battery housing unit. The battery housing unit is detachably mountable on the battery mounting unit for the battery to be mounted on the battery mounting unit, and the at least one wheel and the manual push handle are separable from the battery housing unit.

8 Claims, 5 Drawing Sheets

(51) Int. Cl.
*A01D 69/02* (2006.01)
*B60L 53/80* (2019.01)

(58) Field of Classification Search
USPC .......................................................... 180/6.5
See application file for complete search history.

(56) References Cited

U.S. PATENT DOCUMENTS

| | | | |
|---|---|---|---|
| 9,313,948 | B2 | 4/2016 | Moriguchi et al. |
| D784,899 | S * | 4/2017 | McConnell ............. B60R 27/00 |
| | | | D12/222 |
| 2014/0102065 | A1 | 4/2014 | Moriguchi et al. |
| 2015/0114736 | A1 | 4/2015 | Avganim |
| 2018/0338416 | A1* | 11/2018 | Uemura ............... A01D 34/008 |
| 2019/0014718 | A1* | 1/2019 | Uemura ................... B60K 1/04 |
| 2019/0075724 | A1* | 3/2019 | Becke ................... H02J 7/0045 |
| 2019/0381900 | A1* | 12/2019 | Ito ........................... B60K 1/04 |
| 2020/0365854 | A1* | 11/2020 | Yamada ............. H01M 50/249 |

FOREIGN PATENT DOCUMENTS

| | | | |
|---|---|---|---|
| JP | 201352733 A | 3/2013 | |
| WO | WO-2012158150 A1 * | 11/2012 | ............. B60R 16/04 |

\* cited by examiner

ELECTRIC WORK VEHICLE

CROSS-REFERENCE TO RELATED APPLICATION

This application claims priority to Japanese Patent Application No. 2021-017581 filed Feb. 5, 2021, the disclosure of which is hereby incorporated by reference in its entirety.

BACKGROUND OF THE INVENTION

1. Field of the Invention

The present invention relates to an electric work vehicle, and more specifically to an electric work vehicle including an electric work machine having a battery mounting unit on which a battery is to be mounted attachably and detachably, a battery housing unit that is supported by wheels and houses a battery, and a battery carrier having a manual push handle for manually pushing and moving the battery housing unit.

2. Description of the Related Art

An example of the aforementioned electric work vehicle is described in U.S. Pat. No. 9,313,948B. The electric work vehicle described in Patent Document 1 includes an electric lawn mower serving as the electric work machine and a battery car serving as the battery carrier. The battery car includes a battery case serving as the battery housing unit, rear wheels and front wheels serving as the wheels, and a gripping portion serving as the manual push handle. The battery carrier houses the battery to be installed on the electric work machine and is manually pushed and transported.

Some of the aforementioned electric work vehicles have a configuration in which the battery to be installed on the electric work machine is mounted on the battery mounting unit of the electric work machine while being housed in the battery housing unit on the battery carrier. If this type of electric work vehicle adopts a battery carrier with which, when the battery is installed on the electric work machine, the wheels and the manual push handle are loaded into the electric work machine together with the battery housing unit, it is necessary to keep the size of the battery housing unit so that it does not become an obstacle to the loading of the battery mounting unit when, for example, the outer diameter of the wheels is attempted to be increased so that the wheels can easily go over the unevenness of a transport ground. In addition, even if the manual push handle is attempted to be made large in width or length to facilitate pushing or steering of the battery carrier, it is necessary to keep the size of the battery housing unit so that it does not become an obstacle to the mounting of the battery housing unit onto the battery mounting unit. That is, even if the wheels and the manual push handle are attempted to be designed to facilitate manually pushing and transport of the battery carrier, they need to be designed so that they do not become an obstacle to the installation of the battery on the electric work machine. Consequently, the battery carrier cannot be made easy to manually push and transport to a significant degree.

SUMMARY OF THE INVENTION

The present invention provides an electric work vehicle with a battery carrier that can be easily produced so as to be easy to manually push and transport in a configuration in which the battery is installed on the electric work machine while being housed in the battery housing unit on the battery carrier.

An electric work vehicle according to the present invention includes: an electric work machine including a battery mounting unit on which a battery is detachably mountable; a battery housing unit supported by at least one wheel and configured to house the battery; and a battery carrier including the at least one wheel and a manual push handle configured to be manually pushed to move the battery housing unit, wherein the battery housing unit is detachably mountable on the battery mounting unit for the battery to be mounted on the battery mounting unit, and the at least one wheel and the manual push handle are separable from the battery housing unit.

According to this configuration, the battery can be mounted on the battery mounting unit while being housed in the battery housing unit with the wheels and the manual push handle separated from the battery housing unit. Therefore, the wheels and the manual push handle in any mode do not become obstacles to installing the battery housing unit on the electric work machine. That is, the wheels and the manual push handle can be designed so as to be desirable for manually pushing and transport of the battery carrier even in a configuration in which the battery is mounted on the battery mounting unit while being housed in the battery housing unit. In other words, the battery carrier can be produced so that it can be easily manually pushed and transported.

In the present invention, it is preferable that the battery carrier includes: a support frame configured to support the at least one wheel and the manual push handle; and a joint mechanism for detachably configured to join the support frame to the battery housing unit.

According to this configuration, the wheels and the manual push handle can be attached to and detached from the battery housing unit by an easy operation of simply attaching and detaching the support frame to and from the battery housing unit.

In the present invention, it is preferable that the electric work machine includes a housing unit housing the at least one wheel and the manual push handle, the housing unit being separate from the battery mounting unit.

According to this configuration, the wheels and the manual push handle, which are separated from the battery housing unit, are housed in the housing unit. Thus, the wheels and the manual push handle can be immediately prepared in the electric work machine without having to be brought from a place outside the electric work machine when the battery is unloaded from the electric work machine. As a result, it is possible to quickly start the work of transporting the battery that has been unloaded from the electric work machine.

In the present invention, it is preferable that the electric work machine includes an operator seat and a ROPS, and the housing unit is on the ROPS.

According to this configuration, a housing unit can be obtained with a simple structure that utilizes a ROPS as a support member, compared with specially providing a support member to support the wheels and the manual push handle.

In the present invention, it is preferable that the battery mounting unit includes a placement section on which the battery housing unit is placeable, and the placement section includes: two front rubber portions configured to respectively receive from below and support two left and right front portions of the battery housing unit, and two rear rubber portions configured to respectively receive from below and support two left and right rear portions of the battery housing unit.

According to this configuration, the battery and the battery housing unit are stably supported by the front and rear rubber portions regardless of transmission of driving vibration or the like.

In the present invention, it is preferable that the battery housing unit includes a handle separate from the manual push handle.

According to this configuration, the battery housing unit can be loaded onto and unloaded from the battery mounting unit while the battery housing unit is supported by the handle. It is, therefore, easy to load and unload the battery housing unit onto and from the electric work machine.

In the present invention, it is preferable that the at least one wheel includes two or more wheels.

According to this configuration, the battery carrier can be manually pushed and transported while being stably supported by bringing the two or more wheels into contact with the ground. Thus, it is easy to manually push and transport the battery carrier.

DETAILED DESCRIPTION OF PREFERRED EMBODIMENTS

Hereinafter, an example embodiment of the present invention will be described with reference to the drawings.

An electric work vehicle includes an electric mower A (an example of an "electric work machine") that mows lawn and grass, and a battery carrier C with which a battery to be installed on the electric mower A is manually pushed and transported.

In the following description of a traveling body of the electric mower A, the directions of arrows "F", "B", "U", "D", "L", and "R" shown in FIGS. 1 and/or 2 indicate "body front", "body rear", "upward of the body", "downward of the body", "body left", and "body right", respectively. Further, the direction toward the front of the paper of FIG. 1 indicates "body left", and the direction toward the back of the paper indicates "body right".

Overall Configuration of Electric Mower

Figure 1:
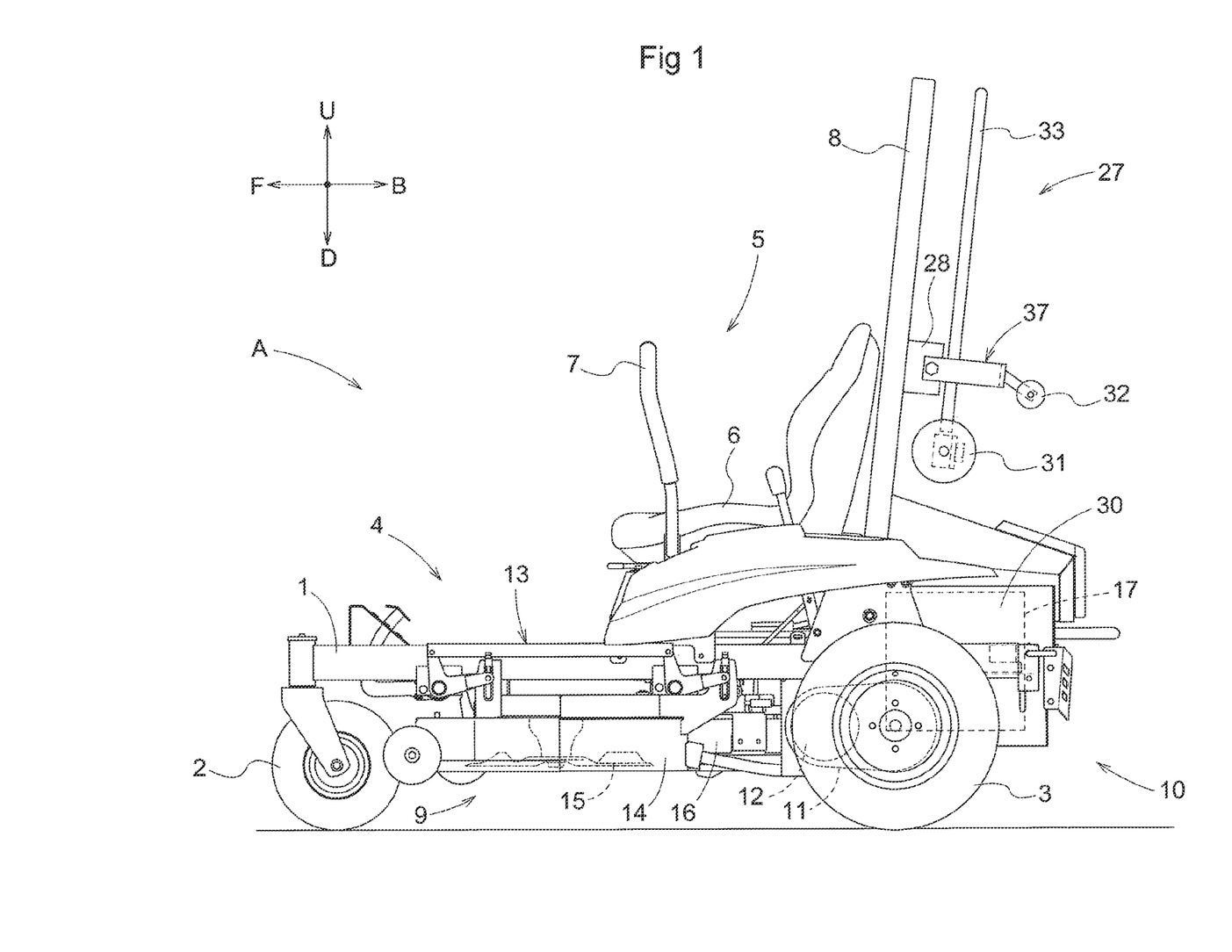
FIG. 1 is a left side view of an entire electric mower with a battery installed.
Figure 2:
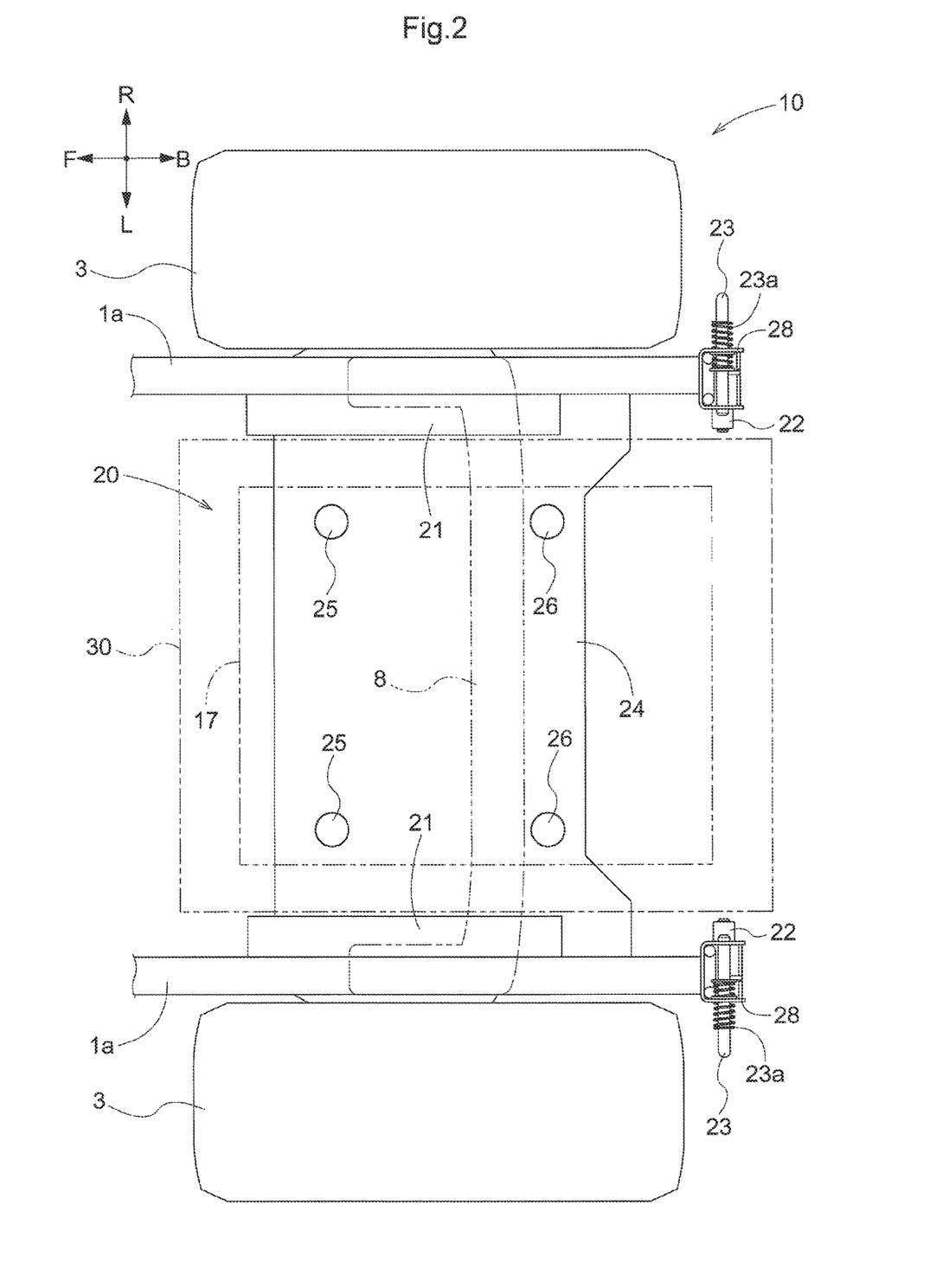
FIG. 2 is a plan view of a battery mounting unit.

As shown in FIG. 1, the electric mower A includes a riding-type traveling body 4 that has a body frame 1, a pair of left and right front wheels 2, which are caster wheels supported at the front of the body frame 1, and a pair of left and right drivable rear wheels 3 supported at the rear of the body frame 1. The operation section 5 is located above the traveling body 4. The operation section 5 includes an operator seat 6 and a pair of left and right steering levers 7 for steering the traveling body 4. The left and right steering levers 7 are separately provided on both sides of the operator seat 6. A ROPS 8 stands on the body frame 1 behind the operator seat 6. A mowing device 9 for mowing the lawn and grass is provided between the front wheels 2 and the rear wheels 3. A battery mounting unit 10 is provided at a rear portion of the traveling body 4.

Configuration of Rear Wheels

As shown in FIG. 1, the left and right rear wheels 3 are separately supported by left and right rear wheel drive cases 11, and are supported by the body frame 1 through the rear wheel drive cases 11. The left and right rear wheel drive cases 11 include electric travel motors 12 for driving the rear wheels 3. The electric travel motors 12 chive the rear wheels 3 by transmitting motive power of the electric travel motor 12 to the rear wheels 3 by means of a deceleration mechanism (not shown) installed in each rear wheel drive case 11. The left electric travel motor 12 and the left steering lever 7 are linked so that the speed of the electric travel motor 12 is changed by pivoting the steering lever 7. The right electric travel motor 12 and the right steering lever 7 are linked so that the speed of the electric travel motor 12 is changed by pivoting the steering lever 7. The left and right steering levers 7 are pivoted to change the speed of the left and right electric travel motors 12 so that the left and right rear wheels 3 are driven at the same driving speed, thereby steering the traveling body 4 so as to travel straight. Further, the left and right steering levers 7 are pivoted to change the speed of the left and right electric travel motors 12 so that the left and right rear wheels 3 are driven at different driving speeds, thereby steering the traveling body 4 so as to turn left or right.

Configuration of Mowing Device

As shown in FIG. 1, the mowing device 9 is supported by the body frame 1 via a link mechanism 13, and is raised and lowered between a lowered work state and a raised non-work state by raising and lowering the link mechanism 13 relative to the body frame 1. The mowing device 9 includes a mowing blade housing 14 that extends in the widthwise direction of the traveling body 4. Mowing blades 15 are provided at a plurality of locations in the left-right direction within the mowing blade housing 14 so that each mowing blade 15 can rotate about of an axis of a vertical support shaft (not shown) that serves as the center of rotation. An electric mowing motor 16 for driving the mowing blades 15 at the plurality of locations is provided at the rear of the mowing blade housing 14. The electric mowing motor 16 drives the mowing blades 15 by transmitting motive power of the electric mowing motor 16 to the support shaft of each mowing blade 15 by means of a belt transmission mechanism (not shown) provided on the upper outer side of the mowing blade housing 14.

Configuration of Battery Mounting Unit

As shown in FIG. 1, the battery mounting unit 10 is provided behind the operation section 5 in the rear of the traveling body 4. The battery mounting unit 10 is configured so that a battery 17 for supplying power to the electric travel motors 12 and the electric mowing motor 16 is mounted on the battery mounting unit 10 while being housed in a battery housing unit 30 (see FIG. 3) provided in the battery carrier C.

Specifically, the battery mounting unit 10 is provided between left and right longitudinal frames 1a provided in the body frame 1 in a state extending in the front-back direction of the traveling body 4, and has a mounting space 20 in which the battery housing unit 30 is loaded, as shown in FIG. 2. Mounting guide rails 21 for guiding the battery housing unit 30 to the mounting position are provided on both lateral sides of the mounting space 20. The left and right mounting guide rails 21 are supported by the longitudinal frames 1a. Mounting guide rollers 22 for guiding the battery housing unit 30 to the mounting position and lock pins 23 for fixing the battery housing unit 30 to the battery mounting unit 10 are provided behind the left and right mounting guide rails 21. The left and right lock pins 23 are supported by support members 28, which are fixed to rear end portions of the respective longitudinal frames 1a, so as to be able to slide left and right. The mounting guide rollers 22 are rotatably supported by the longitudinal frames 1a below the lock pins 23. A placement portion 24 on which the battery housing unit 30 is placed is provided below the mounting guide rails 21. Front rubber portions 25 for receiving from below and supporting left and right two front portions of the battery housing unit 30 are provided in the front of the placement portion 24. Rear rubber portions 26 for receiving from below and supporting left and right two rear portions of the battery housing unit 30 are provided in the rear of the placement portion 24.

As shown in FIG. 1, the electric mower A has a housing unit 27 for housing wheels 31 and 32 of the battery carrier C and a manual push handle 33 (see FIG. 3), separately from the battery mounting unit 10. Specifically, the housing unit 27 has support members 28 provided on left and right column portions of the ROPS 8 as shown in FIG. 1, and houses a support frame 37 for supporting the wheels 31 and 32 and the manual push handle 33 so that the support frame 37 is detachably joined to the left and right support members 28 and is thus supported by the ROPS 8.

Configuration of Battery Carrier

Figure 3:
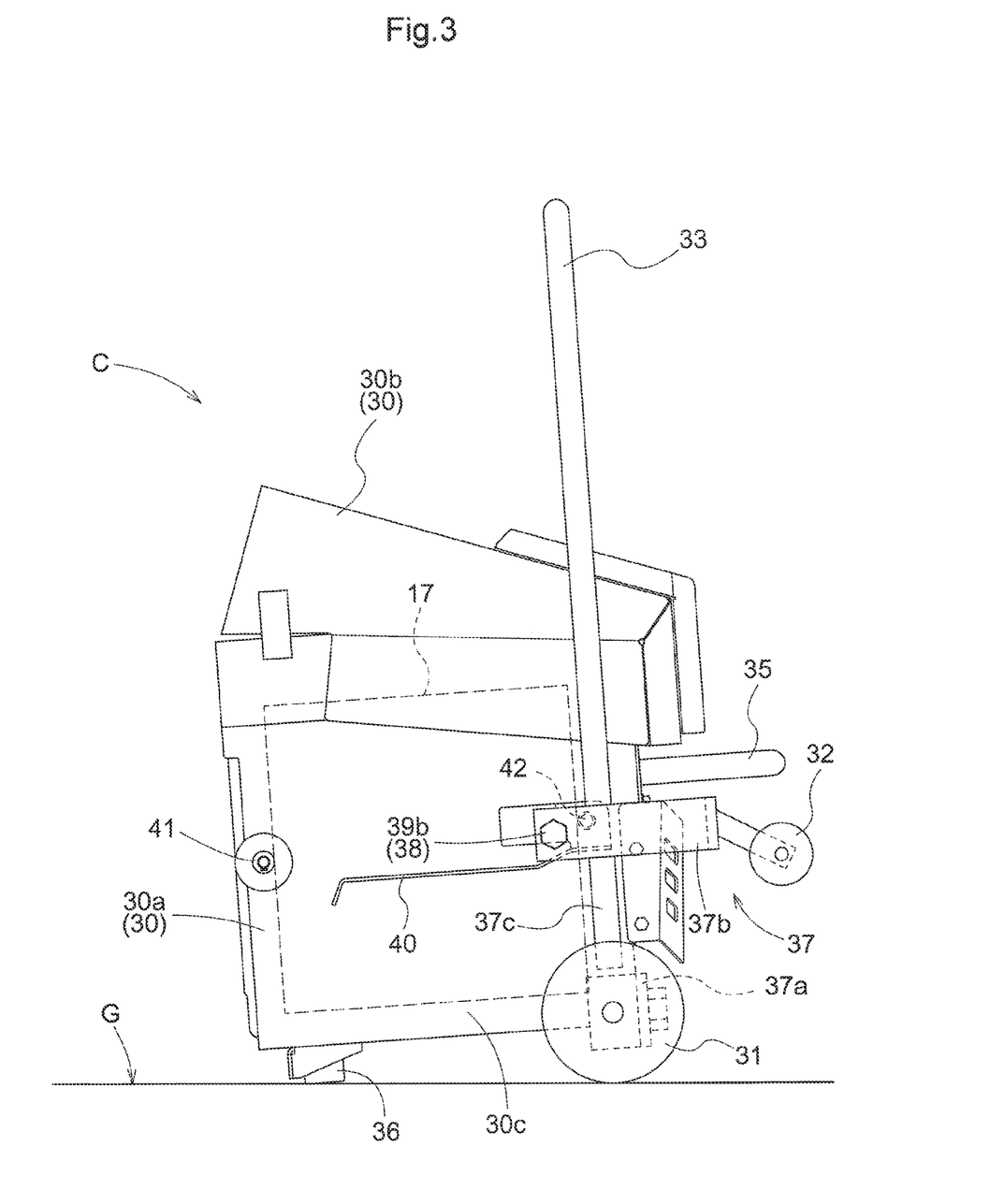
FIG. 3 is a left side view of a battery carrier.
Figure 4:
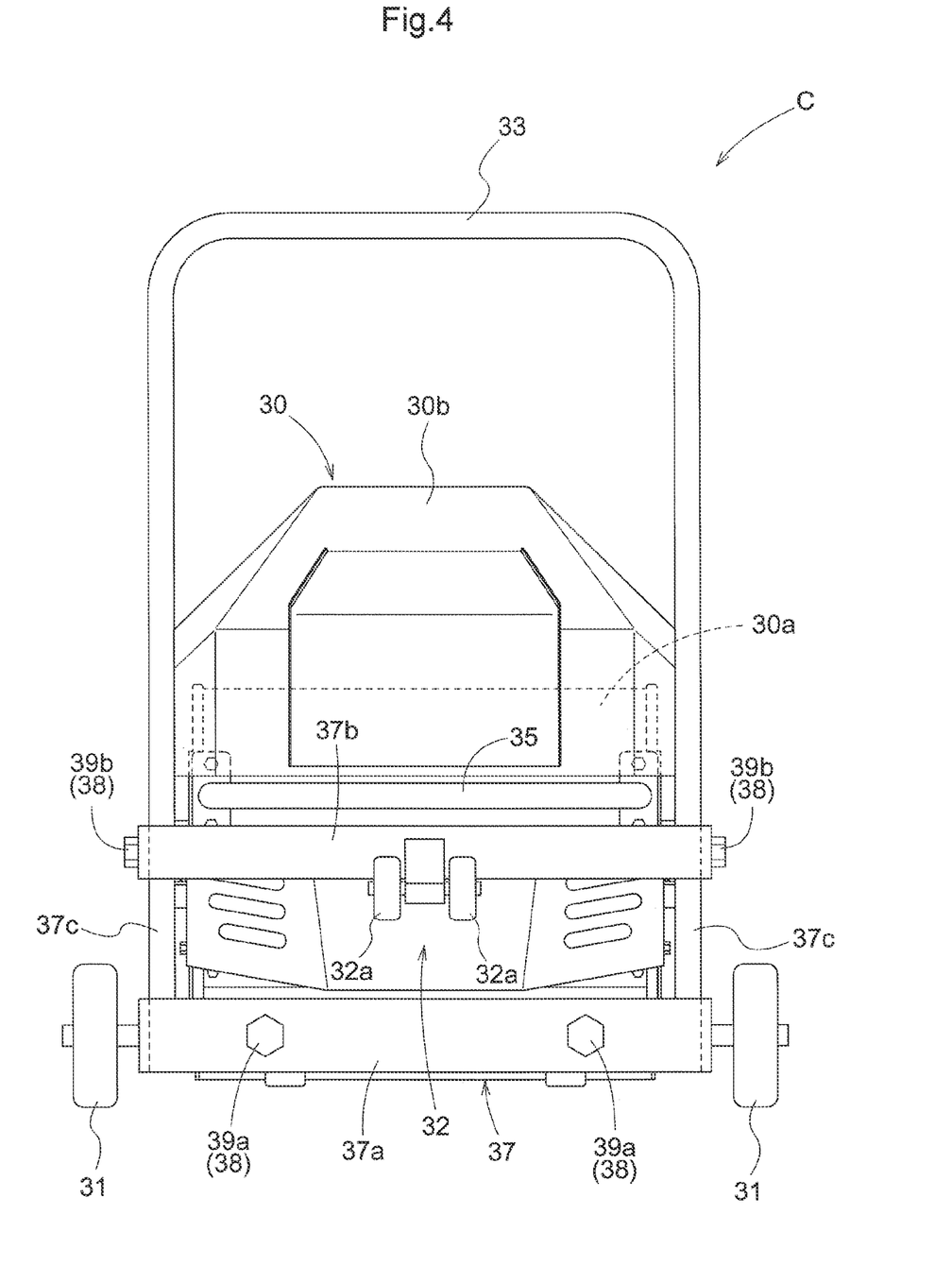
FIG. 4 is a back view of a battery carrier.

The battery carrier C houses the battery 17 to be installed on the electric mower A, and is manually pushed and transported. As shown in FIGS. 3 and 4, the battery carrier C includes the battery housing unit 30 in which the battery 17 is housed, three wheels 31 and 32 supported at the rear of the battery housing unit 30, and the manual push handle 33. A handle 35 that is different from the push handle 33 is provided at the rear of the battery housing unit 30. The handle 35 protrudes rearward from the battery housing unit 30. A front ground-contact portion 36 is provided at the bottom of the battery housing unit 30 in front of the three wheels 31 and 32. The front ground-contact portion 36 is made of an elastic member such as rubber.

The battery 17 is a rechargeable battery. The battery 17 includes a plurality of battery cells.

The battery housing unit 30 is constituted by a battery case. The battery case includes a case body 30a that detachably houses the battery 17, and a case lid 30b that covers the case body 30a from above.

As shown in FIGS. 3 and 4, two first wheels 31 of the three wheels 31 and 32 are supported by the battery housing unit 30 while being separated on both lateral sides of the rear lower part of the battery housing unit 30. One second wheel 32 of the three wheels 31 and 32 is supported by the battery housing unit 30 in a state corresponding to the position between the left and right first wheels 31 and higher than the position of the first wheels 31 in the rear area of the battery housing unit 30. The second wheel 32 has a pair of left and right second wheel portions 32a located on the axis of the same axle, as shown in FIG. 4.

The three wheels 31 and 32 and the manual push handle 33 are attachable to and detachable from the battery housing unit 30. Specifically, the support frame 37 is provided that is detachably joined to the battery housing unit 30 by a joint mechanism 38, as shown in FIGS. 3 and 4. The three wheels 31 and 32 and the manual push handle 33 are supported by the support frame 37, and are attached to and detached from the battery housing unit 30 by attaching and detaching the support frame 37 to and from the battery housing unit 30.

As shown in FIGS. 3 and 4, the support frame 37 includes a first frame portion 37a that supports the left and right first wheels 31, a second frame portion 37b that supports the second wheel 32, and left and right joint rod portions 37c that join the first frame portion 37a to the second frame portion 37b. The left and right joint rod portions 37c are constituted by the bases of the manual push handle 33.

As shown in FIGS. 3 and 4, the joint mechanism 38 includes first joint bolts 39a that join the first frame portion 37a to a rear wall of the battery housing unit 30, and second joint bolts 39b that join both lateral ends of the second frame portion 37b to lateral wall portions 30c of the battery housing unit 30.

The first joint bolts 39a are provided at two locations in the left-right direction of the first frame portion 37a.

As shown in FIG. 3, loading guide rails 40 are provided on the left and right lateral wall portions 30c of the battery housing unit 30. Loading guide rollers 41 are rotatably supported in front of the loading guide rails 40 by the lateral wall portions 30c.

When the battery housing unit 30 is unloaded from the electric mower A, the battery housing unit 30 can be stably placed on a work floor G, such as the ground, with the front ground-contact portion 36 and the first wheels 31 by bringing the front ground-contact portion 36 into contact with the work floor G, as shown in FIG. 3.

The battery 17 is mounted onto the battery mounting unit 10 based on the following mounting procedure.

Figure 5:
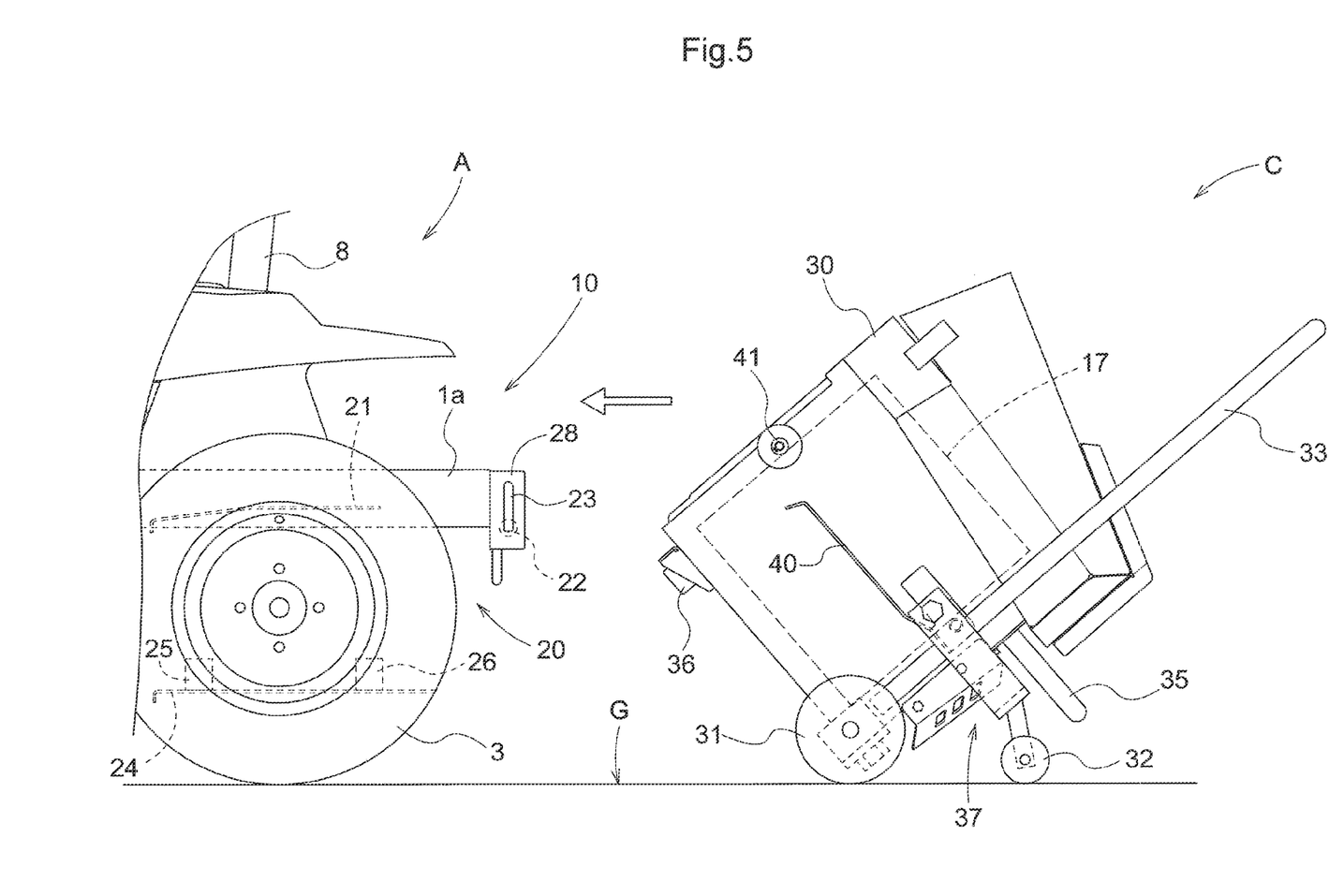
FIG. 5 illustrates a battery mounting procedure.

As shown in FIG. 5, the manual push handle 33 is lowered from the state where the front ground-contact portion 36 is in contact with the work floor G so that the second wheel 32 comes into contact with the work floor G and the battery carrier C is raised on the front side. With the battery carrier C supported by the first and second wheels 31 and 32, the manual push handle 33 is pushed forward to move the battery carrier C toward the electric mower A. After the battery housing unit 30 has approached the battery mounting unit 10 of the electric mower A, the loading guide rollers 41 are placed on the rear of the mounting guide rails 21, and the front of the loading guide rails 40 are placed on the mounting guide rollers 22. Next, the support frame 37 is removed from the battery housing unit 30 to remove the first wheels 31, the second wheel 32, and the manual push handle 33 from the battery housing unit 30. The battery housing unit 30 is pushed forward by the handle 35. The battery housing unit 30 is guided by the mounting guide rails 21 and the mounting guide rollers 22 and is moved toward the distal side of the mounting space 20. When the loading guide rollers 41 are located at front end portions of the mounting guide rails 21, and the mounting guide rollers 22 are located at rear end portions of the loading guide rails 40, the battery housing unit 30 is located at the placement portion 24 and received and supported by the front rubber portions 25 and the rear rubber portions 26. Thus, the battery 17 is mounted in the battery mounting unit 10. When the battery 17 is in a mounted state, the left and right lock pins 23 are slid toward the battery housing unit 30 using lock springs 23a (see FIG. 2). Then, leading ends of the lock pins 23 engage with lock holes 42 (see FIG. 3) in the battery housing unit 30, and the battery housing unit 30 is fixed to the battery mounting unit 10 by the lock pins 23.

As shown in FIG. 1, the first wheels 31, the second wheel 32, and the manual push handle 33 that have been removed from the battery housing unit 30 can be supported by the ROPS 8 and housed in the housing unit 27 by joining the support frame 37 to the support members 28.

Other Embodiments (1) The above embodiment has described an example of adopting a configuration in which the first wheels 31, the second wheel 32, and the manual push handle 33 are attached and detached by attaching and detaching the support frame 37. However, the first wheels 31, the second wheel 32, and the manual push handle 33 may be separately attached and detached.

(2) The above embodiment has described an example in which the left and right first wheels 31 and one second wheel 32 are provided, but the present invention is not limited thereto. For example, a configuration that does not include the second wheel 32 but only includes the left and right first wheels 31 may alternatively be adopted. Alternatively, four or more wheels, such as a pair of left and right front wheels and a pair of left and right rear wheels, may alternatively be provided.

(3) The above embodiment has described an example in which the housing unit 27 is provided, but the present invention is not limited thereto. For example, a configuration without the housing unit 27 may alternatively be adopted. If the housing unit 27 is provided, it may be provided at a location other than the ROPS.

(4) The above embodiment has described an example in which the mounting guide rails 21, the mounting guide rollers 22, the loading guide rails 40, and the loading guide rollers 41 are provided. However, any other mounting structure may be provided.

(5) The present invention is applicable to an electric work vehicle that includes: an electric work machine having a battery mounting unit on which a battery is to be mounted attachably and detachably; a battery housing unit that is supported by wheels and is configured to house the battery; and a battery carrier having a manual push handle for manually pushing and moving the battery housing unit, wherein the battery mounting unit is configured such that the battery is mounted thereon by mounting the battery housing unit thereon attachably and detachably.

What is claimed is:

1. An electric work vehicle comprising:
   an electric work machine including a battery mounting unit on which a battery is detachably mountable;
   a battery housing unit supported by at least one wheel and configured to house the battery;
   a battery carrier including the at least one wheel and a manual push handle configured to be manually pushed to move the battery housing unit; and
   a roll over protection structure (ROPS);
   wherein:
   the battery housing unit is detachably mountable on the battery mounting unit for the battery to be mounted on the battery mounting unit,
   the at least one wheel and the manual push handle are separable from the battery housing unit, and
   the battery carrier is configured to be mounted on the ROPS.

2. The electric work vehicle according to claim 1, wherein the battery carrier comprises:
   a support frame configured to support the at least one wheel and the manual push handle; and
   a joint mechanism detachably configured to join the support frame to the battery housing unit.

3. The electric work vehicle according to claim 1, wherein:
   the electric work machine comprises a housing unit housing the at least one wheel and the manual push handle, and
   the housing unit is separate from the battery mounting unit.

4. The electric work vehicle according to claim 3, wherein:
   the electric work machine includes an operator seat, and
   the housing unit is on the ROPS.

5. The electric work vehicle according to claim 1, wherein:
   the battery mounting unit comprises a placement section on which the battery housing unit is placeable, and
   the placement section comprises:
      two front rubber portions configured to respectively receive from below and support two left and right front portions of the battery housing unit; and
      two rear rubber portions configured to respectively receive from below and support two left and right rear portions of the battery housing unit.

6. The electric work vehicle according to claim 1, wherein the battery housing unit includes a handle separate from the manual push handle.

7. The electric work vehicle according to claim 1, wherein the at least one wheel includes two or more wheels.

8. An electric work vehicle comprising:
   an electric work machine including:
      a battery mounting unit on which a battery is detachably mountable;
      an operator seat; and
      a roll over protection structure (ROPS);
   a battery housing unit supported by at least one wheel and configured to house the battery;
   a battery carrier including the at least one wheel and a manual push handle configured to be manually pushed to move the battery housing unit,
   wherein:
   the battery housing unit is detachably mountable on the battery mounting unit for the battery to be mounted on the battery mounting unit,
   the at least one wheel and the manual push handle are separable from the battery housing unit,
   the electric work machine comprises a housing unit housing the at least one wheel and the manual push handle,
   the housing unit is separate from the battery mounting unit, and
   the housing unit is on the ROPS.

* * * * *